Aug. 5, 1941.  W. W. HANSEN  2,251,569

HIGH EFFICIENCY RESONANT CIRCUIT

Original Filed July 27, 1936  3 Sheets—Sheet 1

INVENTOR
WILLIAM W. HANSEN
BY
Herbert H. Thompson
HIS ATTORNEY.

Aug. 5, 1941.   W. W. HANSEN   2,251,569
HIGH EFFICIENCY RESONANT CIRCUIT
Original Filed July 27, 1936   3 Sheets-Sheet 2

INVENTOR
WILLIAM W. HANSEN
BY
HIS ATTORNEY.

INVENTOR
WILLIAM W. HANSEN,
BY
ATTORNEY

Patented Aug. 5, 1941

2,251,569

UNITED STATES PATENT OFFICE 2,251,569

HIGH EFFICIENCY RESONANT CIRCUIT

William W. Hansen, Stanford University, Calif., assignor to The Board of Trustees of the Leland Stanford Junior University, Stanford University, Calif., a corporation of California Original application July 27, 1936, Serial No. 92,787, now Patent No. 2,190,712, dated February 20, 1940. Divided and this application January 4, 1939, Serial No. 249,194

6 Claims. (Cl. 250—27)

REISSUED
JUL 27 1948

The principal object of the present invention is to provide novel means for changing the velocity of electrons.

Another object of the present invention lies in the provision of novel cavity resonator or hollow oscillatory circuit means for establishing an oscillating electric field together with means for passing electrons through said field to change the velocity of the electrons.

Still another object of the present invention is to provide means for passing electrons a plurality of times through a cavity resonator, each successive passage of the electrons serving to further enhance the desired velocity change in the electrons, thereby sinusoidally altering the velocity of the electrons at high frequency while in flight and effectively accelerating the electrons to high velocities.

Still another object of this invention is to provide a novel means and method for converting a direct current or low frequency current at relatively low voltage to high frequency oscillating currents of high voltage resonant within a hollow resonator and passing electrons through the field of said resonator to accelerate the electrons to high velocities as for use in the production of penetrating X-rays.

Other objects and advantages of this invention will become apparent as the description proceeds.

This application is a division of my copending application, Serial No. 92,787, filed July 27, 1936, Patent No. 2,190,712, dated Feb. 20, 1940 for High efficiency resonant circuit.

Briefly as to apparatus, my invention comprises a closed conducting shell constituting the inductance and capacitance of a resonant circuit, with one or more generators mounted preferably within the shell connected to energize the circuit.

The production of electromagnetic oscillations of the order of one meter or less in wave length is difficult owing to the increased capacitative and inductive interaction between various circuit leads and elements, the increased effective resistance of the conductors, and a tendency to parasitic radiation from leads and inductances as the wave length is reduced to the same order of magnitude as the dimensions of various circuit elements.

Proper shielding and arrangement of parts can overcome in part the inter-lead reactions, but if it is desired to operate several tubes in parallel to secure greater output, these effects are complicated by the additional physical handicaps in spacing and arranging the parts, and offer a serious obstacle to satisfactory operation.

The increase in the effective resistance is due to the unsymmetrical distribution of current in the conductors and inductances. The higher the frequency, the greater the tendency of the current to travel on the surface of the conductors; and to crowd to the outer side of inductance windings, consequently the amount of conducting material actually serving is reduced and the effective resistance increased. There is a limit to the gain that may be made by using conductors of larger size, set by the physical limitations of the circuit and the frequencies which are to be produced.

These obstacles and the tendency toward parasitic radiations may be overcome, however, by utilizing the type of resonant circuit hereinafter described, wherein more stable operation is secured by eliminating the inter-lead reactions, and high efficiency is obtained by eliminating parasitic radiation and securing an even distribution of current through a large conducting path.

The operation of my invention may be better understood by reference to the drawings.

Figure 1:
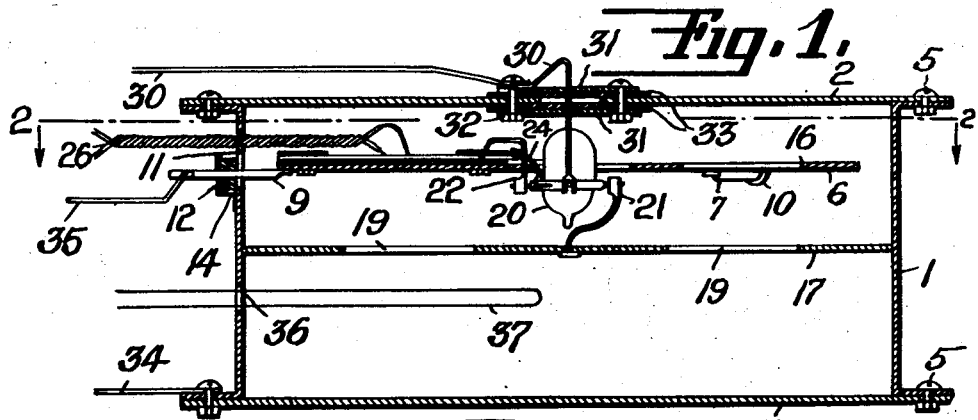
Figure 1 is a partially sectional view of one type of resonator.

In Figure 1, I have shown a sectional view of a hollow resonator claimed in application Ser. No. 92,787, wherein a cylindrical shell 1, of copper or other material of high conductivity, is closed by end plates 2 and 4, of similar material, fixed to the cylindrical shell 1 by bolts 5 or equivalent means. Within the shell 1, a cathode plate 6, of diameter substantially less than that of said shell, is supported parallel to the end plates 2 and 4 by symmetrically placed supporting studs 7 and 9. Ports 10 and 11 through the shell 1 permit studs 7 and 9 to pass therethrough without making contact with the shell, and to engage insulating blocks 12, fixed to shell 1 by brackets 14, which serve to support the cathode plate 6 in fixed position relative to the shell 1. Cathode plate 6 is centrally perforated by passage 15, and further passages 16 are symmetrically disposed thereabout.

An anode plate 17 is fixed between and parallel to the ends 2 and 4, soldered or otherwise suitably connected and attached to shell 1. Apertures 19 are symmetrically disposed therethrough: in Figures 1 and 2, these apertures are shown in registry with apertures 16 through the cathode plate 6. This arrangement is optional, as is the position of the apertures 16 in the cathode ground plate 6.

Figure 2:
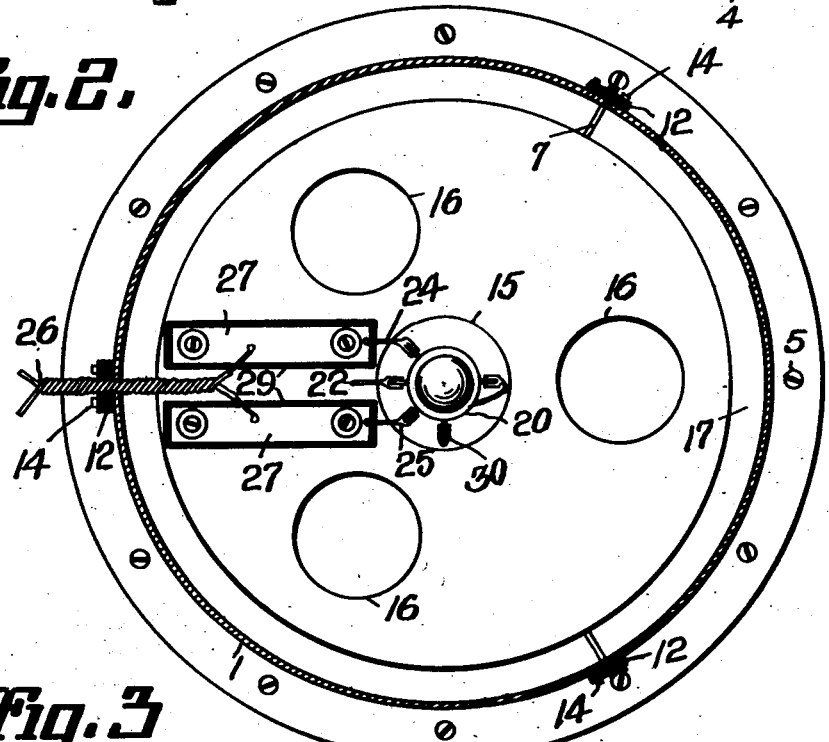
Figure 2 is a sectional view taken along line 2—2 of Figure 1.

In the embodiment of my invention shown in Figures 1 and 2, I have made use of one vacuum tube 20 as the oscillation generator; the tube shown is a triode with heater cathode, known to the trade as the "acorn" type, which is peculiarly adapted by reason of its low internal capacity, low transit time, and short, well spaced leads to operation on wavelengths down to 0.5 meter. Connection is made to the leads by a special clip type of terminal. Lead and clip 21 connect the anode to anode plate 17. The cathode plate 6 is connected to the cathode terminal by lead 22. Leads 24 and 25 supply current to the heater. The necessary current is carried into the shell by a twisted pair of wires 26, which connect to a pair of flat copper strips 27 separated from the cathode plate 6 by mica spacers 29; one of the strips 27 is connected to lead 24 and the other to lead 25. The strips 27 form a radio-frequency by-pass to the cathode ground plate 6. End plate 2 is perforated to permit entrance of grid lead 30, which is centrally positioned by a pair of copper plates 31 fixedly held by bolts 32 relative to end 2, but insulated therefrom by mica sheets 33. The copper plates 31 form a capacitative connection between the grid circuit and the end plate 2 of the shell, although conductive connection is prevented by the mica sheets 33. Lead 34 connects shell 1 to an external anode potential source, and lead 35, connected to supporting stud 9, supplies the negative return from that source to the cathode.

An aperture 36 may be formed through shell 1, and a loop 37 inserted through it, for reasons later to be explained. It will be apparent to those skilled in the art that the "acorn" tube could be replaced by any other suitable type of generator capable of producing oscillations of the frequency of the resonant system. The means and method of transferring energy from the generator to the interior of the resonant chamber is, of course, a part of my invention.

While I have shown the oscillation generator inside the shell, it is also possible to mount it outside, and operate the circuit in similar fashion. In various embodiments such external mounting may be advantageous in providing better cooling facilities, greater ease of mounting, or different arrangements of the plates within the shell. The form of the anode and cathode plates may be modified greatly; in some cases a wire loop is sufficient, and many other modifications in form may be made within the scope of the claims.

Figure 3:
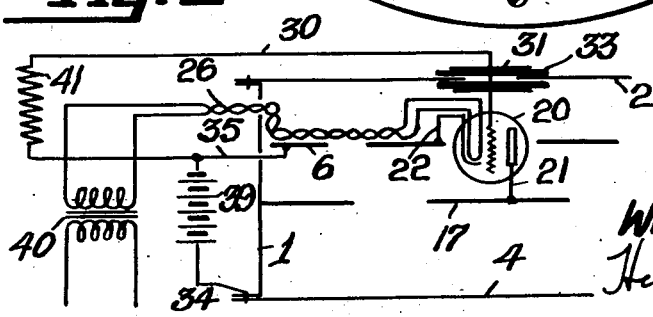
Figure 3 is a schematic diagram of the structure of Figs. 1 and 2.

Figure 3 shows schematically the connections for operation. A battery 39 or other constant potential source of direct current is so connected to leads 34 and 35 as to place a positive potential on the anode of tube 20. An alternating current transformer 40, connected to the twisted pair of leads 26, supplies the heater current. Grid bias is obtained from the drop across a resistor 41 connected between cathode plate 6 and grid lead 30. Or, tubes may be operated in parallel, and supported within apertures 16 as in Fig. 10.

Figure 9:
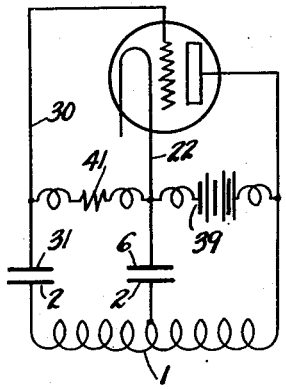
Figure 9 is a schematic circuit diagram of my resonant oscillator.

A schematic circuit diagram for the embodiment of Figures 1 to 3 is shown in Figure 9. The closed inductive loop formed by shell 1 and end plates 2 and 4 is coupled to the grid by the capacitance between plates 31 and end plate 2. The direct current return connection to the cathode is provided through a closed inductive loop composed of lead 30, resistor 41 supplying the grid bias, and the cathode plate 6. A "C" battery might be substituted for the resistor 41, and be deemed equivalent thereto. The radio frequency current between cathode and grid through the inductance loop including plate 6 and shell 1 is accomplished by the capacitative connection between end plate 2 and cathode plate 6. The circuit between cathode and grid either by way of resistor 41 or by way of shell 1 encloses exactly the same lines of force.

Similarly in the anode circuit; the direct conductive path between anode and cathode links the same lines of force as does the capacitatively coupled path.

By virtue of the blocking-condenser action of these capacitances, a path is provided for leading anode and grid potentials to the tube without passing through the main inductance, and without setting up circulating currents in the loop formed by the parallel paths, since the same number of lines of force are enclosed by both.

With the embodiment shown in Figures 1 to 3, as with any closed shell, oscillations may be set up in the circuit at a number of resonant frequency points but there will be no radiation from the closed shell, in spite of the fact that the physical dimensions may be of the order of the wavelengths produced by the frequency of oscillation. That this is possible may be seen from certain considerations.

Assume that the closed conducting surface within which an oscillating field exists, has a thickness large compared with the skin effect depth.

There will then be always in the conductor a depth at which the field E is vanishingly small. Therefore the Poynting vector also vanishes, and integrating the Poynting vector over the closed surface it is found that no energy diverges from the region bounded by the conductor.

The frequency of oscillation within such closed surfaces may be calculated analytically for a few shapes of closures.

It is well known that electro-magnetic fields vary in accord with Maxwell's equations, which in free space simplify to $$\Delta \cdot E = 0 \qquad \Delta \cdot B = 0 \qquad (1)$$

$$\Delta \times E = -\frac{1}{c}\dot{B} \qquad \Delta \times B = \frac{1}{c}\dot{E}$$

where E is the strength of the electric field, B is the strength of the magnetic field, and C is a constant.

These may be changed by standard transformations to the form $$\Delta^2 E - \frac{1}{c^2}\ddot{E} = 0 \quad (2)$$

and an equivalent equation for B.

Assuming that the equations are to be applied to a wave of a single radian frequency $\omega$, the wave number $$K = \frac{\omega}{c}$$

may be introduced into Equation 2, which becomes $$\Delta^2 E + K^2 E = 0 \quad (3)$$

The above equations apply strictly to the conditions in free space. If a conductor is present, Equations 1—3 must be supplemented by adding terms involving charges and currents. In the present case, these terms may be taken into account by requiring that E satisfy certain boundary conditions as well as Equation 3. Assuming a thin closed surface of infinite conductivity Equation 3 must hold inside and outside of the surface, and the tangential component of E must be zero on that surface.

When Equation 3 is applied to wave motion in free space, any value of K is possible, but when boundary conditions are imposed, only certain discrete values of K will be compatible with those conditions. For example, for any value of $l$ and $m$, a solution of Maxwell's equations is $$E_z = \cos l \times \cos my \sin \omega t$$

with $$l^2 + m^2 = K^2$$

and $$\omega = 2\pi r \quad (4)$$

If a cubical shell of zero resistance and side $a$ is considered, for solutions good inside the shell, the boundary conditions require that, assuming one corner of the cube at the origin, $$E_z = 0, \text{ at } x = 0, a \text{ and } y = 0, a \quad (5)$$

To satisfy this limitation, certain values of $l$ and $m$ must be used such that $$l = \frac{n\pi}{a} \text{ and } m = \frac{n'\pi}{a} \quad (6)$$

where $n, n' = 1, 2, 3 \ldots$ and accordingly K is fixed, with the frequency $$K = \frac{\pi}{a}\sqrt{n^2 + (n^1)^2} \quad (7)$$

This assumes that the shell is a perfect conductor. With a finite resistance, the allowed frequencies will be shifted slightly, and the oscillations damped exponentially.

Any closed box will have a set of frequencies at which it may oscillate; for certain simple shapes, analyses similar in general form to that given above for the cube, may be made. For spheres, the analysis may be carried out by the use of functions developed by Mie and Debye; for cylinders, by combination of Bessel's functions developed by the inventor and James G. Beckerley; comparable analyses may also be carried out with shapes determined by holding constant various coordinates in any of the separable systems of Stäckel.

The separable systems of Stäckel are orthogonal systems of confocal quadric surfaces. These systems are well known in the field of mathematical literature, examples of which are:

(1) Comptes Rendus, vol. 116 (1893) page 485.

(2) Mathematische Annalen, vol. 54 (1901) page 86.

(3) Mathematische Annalen, vol. 98 (1928) page 749.

(4) Annals of Mathematics, vol. 35 (1934) page 284.

(5) Courant-Hilbert, "Methoden der Mathematischen Physik" I, pages 275-279.

(6) Darboux, "Lecons sur les Systems Orthogonaux et les Coordoones Curviliques" especially Livre II, Chap. III, IV, and V.

These mathematical systems, although well known as means for the delineation of a wide range of geometrical forms, have not heretofore been used in the computation of resonant circuits. Inasmuch as a complete mathematical discussion of the orthogonal systems can be found in the mathematical literature it is sufficient for present purposes to indicate some simple examples applicable to the computation and design of practical embodiments of this invention.

One convenient system is that described by a pair of hyperbolae of revolution intersecting and confocal with an ellipsoid of revolution. This system develops enclosures that resemble a barrel with the ends dented in. The dented ends are hyperbolae confocal with the ellipsoid of which the side of the barrel is a sector. This system may be varied between two easily described limits. One limit is that in which the two foci become coincident and thus become the center of a hollow sphere with reentrant sections of conical shape meeting in the two conical apexes at the center of the sphere. In other words the barrel side has become a sector of a sphere and the dented ends have been formed into cones whose apexes meet at the center of the spherical barrel. The other limit is that in which the foci have been separated by an infinite distance, in which case the sides of the ellipsoid are straight and the intersecting section of the hyperboloids are flat. This produces a right circular cylinder as shown in Fig. 1 in which the cylindrical shell I is a section of an ellipsoid and the flat ends 2 and 4 are sections of hyperboloids.

Similarly the cube is a limiting case of intersecting confocal superposed hyperboloids and ellipsoids. The sphere is a special case of one system.

All the forms of my invention derivable in coordinates of the Stäckel systems are subject to exact mathematical computation, although some of them present considerable practical difficulties in the complete exact solutions. However, it is entirely feasible to compute a configuration approximating any practical form ordinarily desired. For example, exact computations can be made of the properties of the limiting case of the barrel-shaped form in which the side is spherical and the ends are reentrant cones. Then exact computations can be made of the same form in which the foci have been separated so the reentrant hyperbolic barrel ends reach well into the barrel but do not touch, for example, one-fourth the way from each end. The two computations then will give results between which a practical intermediate form can be estimated.

Obviously the mathematically derived forms will but rarely be the precise form desired for manufacture. The sharp edges of intersection of the mathematical surfaces will be rounded for spinning in sheet metal, although for forms closed by rolling as may be done with metal can machines the edges may have square corners.

The references to the Stäckel systems are made primarily for convenience in computation. The practical configuration of the invention may be of any form whatever. For example, the limiting Stäckel form of the right circular cylinder may be deformed by making the ends reentrant and of any convenient shape, keeping the sides straight for convenience in manufacture. By computing a series of dimensioned Stäckel configurations, it will be immediately apparent that the electrical properties will vary in accordance with the dimensions. The following properties are the ones usually considered in resonant circuits: i. e., natural frequency, shunt impedance, ratio of reactance to resistance, etc. Accordingly, it is obvious that any range of adjustment of any of the properties, can be had by changing the shape of the chamber.

In the case of a sphere, the most simple fields and the lowest frequency radiations may be shown to occur with wavelengths of $1.40r$ and $2.30r$, where $r$ is the radius of the sphere. These values may be derived from the vector wave equations in spherical coordinates, all possible non-infinite solutions of which are given by:

$$A_{2,\,l,\,m} = K \Delta \times (r, \xi, l, m) \qquad (8)$$

and $$A_{3,\,l,\,m} = K \Delta \times A_{2,\,l,\,m} \qquad (9)$$

where $$\xi = \frac{1}{\sqrt{Kr}} J_{e+1/2}(Kr) P_e^m(\cos\theta) e^{im\varphi}$$

and $$K = \frac{\omega}{c}$$

Letting Equations 8 or 9 represent the field E, the problem is resolved into finding K and hence $\omega$ values which will make the tangential component vanish at the conducting surface. This involves finding the roots of a certain combination of Bessel's functions. There are an infinite number of such roots, but the simplest one corresponds to only one nodal surface for E, at the conducting boundary, and it is this mode of oscillation that would normally be used.

Figure 4:
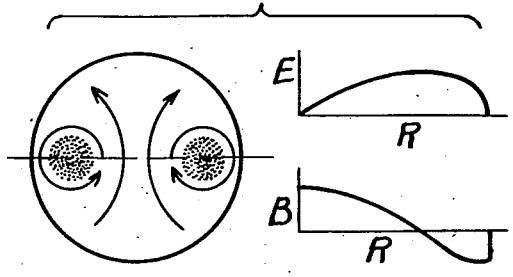
Figure 4 shows schematically and graphically the distribution of potential and magnetic lines of force in a spherical embodiment of resonator.

For the function $A_2$ of Equation 8, the wavelength is given by the relation $\lambda = 1.40r$, and oscillations are produced within the sphere in the mode of Figure 4, wherein the arrows represent the direction and relative magnitude of the magnetic field B, and the dots represent the electrostatic field E, lines of which run parallel to the equator. The graphs of Figure 4 show the variations of E and B plotted along the equatorial plane against the radius R, with the origin at the center of the sphere.

Figure 5:
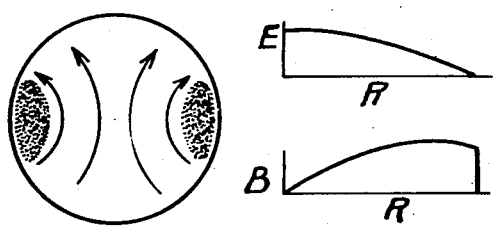
Figure 5 shows relations similar to those of Figure 4 for an alternative mode of oscillation.

The function $A_3$ of Equation 9 involves the value $\lambda = 2.30r$, and the oscillations occur with a voltage and field distribution such as that shown in Figure 5, where the arrows represent the direction of the electrostatic field and the dots represent the points of greatest intensity of magnetic field, which runs parallel to the equator. The accompanying graphs show E and B again plotted equatorially against the radius R, with origin at the center of the sphere.

Figure 6:
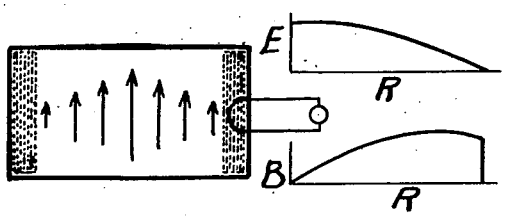
Figure 6 shows relations similar to those of Figures 4 and 5 for a cylindrical structure.
Figure 7:
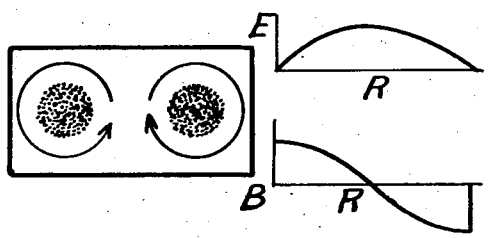
Figure 7 shows relations similar to those of Figure 6 for an alternative mode of oscillation.

With a circularly cylindrical shell the two simplest modes of oscillation occur as shown in Figure 6, with a wavelength $\lambda = 2.62r$ and Figure 7 with $$\lambda = \frac{1}{\sqrt{\frac{1}{4H^2} + \frac{1.49}{r^2}}}$$

where $r$ = radius and $H$ = height of the shell.

In Figure 6, the field relations are shown for the method of oscillation used in the embodiment of Figures 1 and 2. The arrows represent the direction and strength of the electric field, and the dots represent the points of greatest intensity of the magnetic field, which runs around the interior periphery of the shell normal to the electric field. The graphs show E and B values against the radius R on the horizontal midplane of the shell.

Figure 8:
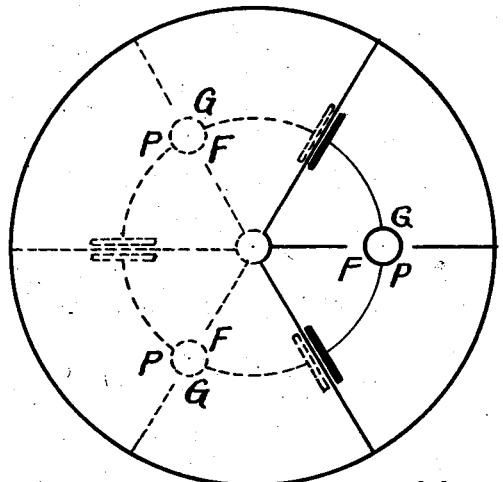
Figure 8 is a schematic diagram illustrating an alternative arrangement of the oscillating resonant circuit of Figures 1 to 3.

In Figure 7 the arrows represent the direction of the magnetic field, and the dots represent the electric field, which runs around the shell horizontally. The curves are plotted on the horizontal midplane of the cylindrical shell. The arrangement of the shell and tube for oscillation in the manner of Figure 7 is shown schematically in Figure 8. In this case, the dividing partitions are inserted parallel to the axis of the cylindrical container rather than normal thereto. The dotted lines indicate the method of inserting additional tubes for parallel operation to increase the power output. The connecting leads must be kept at right angles to the electric field, but may be otherwise arranged at will.

The mode of oscillation may be changed by varying the position and arrangement of the leads and tubes, and since there are an infinite number of discrete resonance frequencies possible in a closed container, the tubes and connecting leads may be so inserted as to excite any desired mode of oscillation.

There is in general a discontinuity of the magnetic field at the inner surface of the conductor, which implies a current sheet there. The power lost in maintaining this current sheet is proportional to the square of the field strength, the square root of the resistivity (inversely to the square root of the conductivity), and the 3/2 power of the wavelength. The latter factor is due to the fact that if the size of the shell is doubled to double $\lambda$, the area is multiplied four times and the skin depth increased by $\sqrt{2}$, so raising the losses by $$\frac{2}{\sqrt{2}}, \text{ or } 2^{3/2}$$

The losses are given to order of magnitude in $$ergs/sec. \text{ by } P = \frac{E^2 \lambda^{3/2} C^{3/2}}{16\pi^2 \sigma^{1/2}} \qquad (10)$$

where E = field strength in electrostatic volts, $\lambda$ = wave length in cm.
$c$ = vel. of light = $3 \times 10^{10}$ cm.
$\sigma$ = conductivity = $5.14 \times 10^{17}$ for the copper shell used.

A more useful figure for some purposes is $2\pi$ times the ratio of the energy stored in the electromagnetic field to the energy lost per half cycle. This number is independent of the field strength and is the quantity which plays the same role for the present type of oscillating circuit that $$Q = \frac{L\omega}{r}$$

plays in ordinary circuits. In fact one easily finds that $$Q = \frac{L\omega}{r} = 2\pi \frac{\text{energy in inductance at peak of cycle}}{\text{energy lost per cycle}} \quad (11)$$

For any reasonable shape of "resonant circuit" of the type herein described the equivalent Q is about $10^5$ for a wavelength of 100 cm.

It should be noted, that since the current distribution is uniform in the conductor, and the size of the path is much greater than that available by other means, the $I^2R$ losses are slightly compared to those in conventional circuits.

The theoretical discussion given above, properly interpreted, constitutes a mathematical description of my invention as an energy field, together with its associated currents and material boundary. A comparison of the mathematical statement given above, with corresponding statements applicable to the prior art, will clearly distinguish my invention from other resonant devices and shielding arrangements that might be confused with it because of apparent external resemblances.

Having shown thus that it is possible to produce oscillations at various desired resonant frequencies and high efficiencies, various embodiments will now be described for the useful application of the ultra high-frequency currents produced.

If it is desired to utilize the resonant circuit as a power source for radio transmission, an aperture, as 36 in Figure 1, may be made in the shell 1, and a loop 37 inserted to link the fields, thereby producing a current in the loop which may be fed directly to an antenna system. The size, shape, and position of the loop may be varied in accord with the mode of oscillation used.

Figure 11:
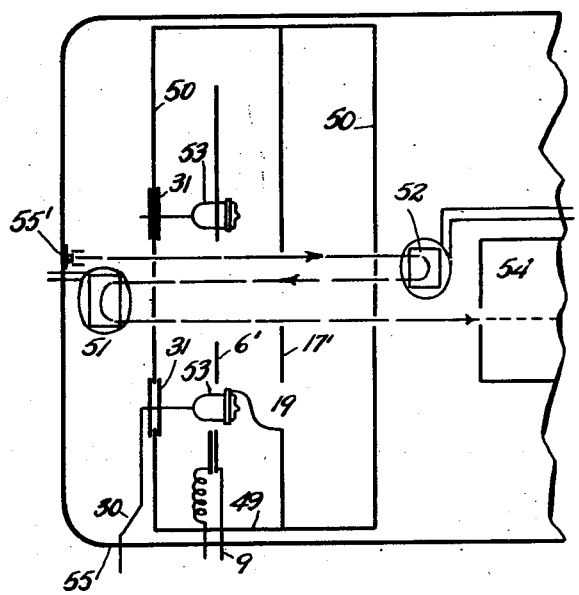
Figure 11 is a schematic section taken along line 11—11 of Fig. 10.
Figure 10:
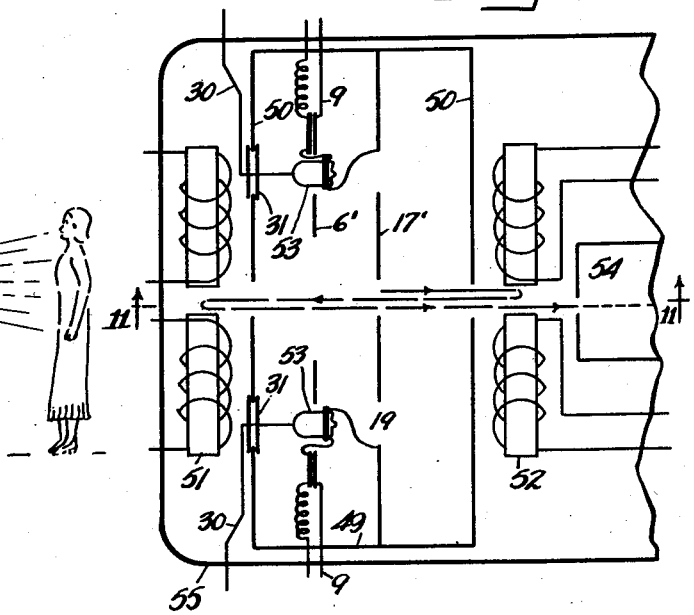
Figure 10 illustrates schematically the use of any resonant oscillator to produce electrons of extremely high velocities.

The fields produced are not only useful in providing circulating currents, but by proper construction, they may be used to accelerate electrons for various purposes, as shown in Figs. 10 and 11.

In Figure 10, I have shown schematically a cylindrical shell 49 within an airtight envelope 55 having suitably apertured cathode and anode plates 6' and 17' therein, and centrally apertured end plates 50, set between two pairs of electro-magnets 51 and 52 arranged to concentrate a magnetic field close to the central axis of and at either end of said cylinder and normal thereto. Free electrons directed by suitable emitting means 55' into the central portion of shell 49, are accelerated by the electric component of an intense oscillating electromagnetic field built up by the oscillators 53. The electric component of this field is most intense at the center of member 49 and extends from end to end of this member, within the same. If sufficient accelerating potential is available, a single passage across the shell may suffice to give the desired electron velocity. If a greater velocity is desired, or the accelerating potential is low, the electron may be caused to reverse its direction of travel each half cycle, and travel back and forth until the desired velocity is obtained, as indicated schematically by the arrows. If the electrons enter the chamber with an initial velocity of several hundred thousand volts, the velocity is so large a percentage of the speed of light that further energy additions do not increase the speed markedly since no electron can exceed the velocity of light, and the electrons may be passed back and forth, gaining energy each half cycle, without getting out of phase with the oscillating field.

These reversals of direction are accomplished by passing the electrons into the field of magnets 51 and 52 in a direction normal thereto, see Fig. 11, whereupon they are diverted from their paths in a direction perpendicular to both path and field, and caused to return in the opposite direction. The dimensions of the resonant circuit shell 49 and the distances between the reversing magnets 51 and 52 are determined by the frequency of oscillation of the system and the velocity of the electrons. The distance between magnets 51 and 52 should be substantially that traversed in one-half period of oscillation of the system by an electron of velocity corresponding to the voltage by which it has been accelerated. The intervals spent by the electrons outside of the oscillating field, that is, exterior of the chamber, which intervals are determined by the strength and location of the magnets 51 and 52, are controllable at will, so that the electrons on all passages through the oscillating field will enter in the proper phase relation to continue the desired change in velocity. Further, it will be noted that, while the flight time of the electrons in passing through the resonant chamber is decreasing with each additional passage, it will also be noted that as the electrons speed up their curved paths at each reversal of direction becomes larger in diameter and if the electron velocity is a considerable fraction of the velocity of light, the time spent in making this curved path is increasing, and can be made to produce a first order compensation of the decrease in time in the rest of the path. Hence, it is possible to make a number of transits before an appreciable phase error develops.

By properly arranging the fields the electrons may be permitted to leave the accelerating chamber after developing a certain desired velocity, the electrons passing below magnets 52 and being shot into a chamber 54 for any desired use.

Figure 12:
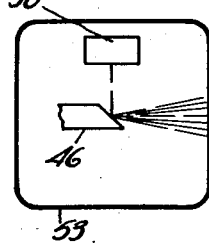
Figure 12 illustrates schematically the use of my resonant oscillator for the production of X-rays.

In Figure 12 I have indicated that an oscillator 50 arranged to develop high velocity electrons may be so placed within an envelope 53, as to direct a stream of said electrons upon a suitable anode 46 to develop X-rays of great penetrating power, for producing X-ray for cancer treatment, or for other desired purposes.

A number of modifications of the embodiments described, all within the scope of the appended claims, will occur to those skilled in the art.

It is apparent that the envelope 55 shown in Figure 12 may be evacuated to any desired degree, and the envelopes of tubes 53 may be removed. This may be extended to the design of Figures 1 and 2, and to other embodiments, particularly those utilizing large amounts of power, and the tube elements may be freely modified and simplified without regard to conventional limitations resulting from the necessity of maintaining a vacuum and providing supporting and connecting leads within a closely associated envelope. It is also apparent that I may utilize the oscillating fields within a closed conducting shell to heat inorganic matter, both conducting and non-conducting, as well as organic, the device then constituting an ultra high-frequency induction furnace. It is also apparent that suitable modifications of my oscillating circuit will permit it to be used as an amplifier.

For a complete understanding of this invention it should be emphasized that it is concerned primarily with the delineation of a confined oscillating electromagnetic field and the transfer of energy into or out of said field. The geometrical form of the apparatus and of the electromagnetic field bounded and delineated thereby is of secondary importance, particularly in view of the variety of mechanical shapes of shielded electromagnetic circuits known in the prior art. What is important is the mode of oscillation of the confined electromagnetic field and the corresponding arrangements for sustaining and using said field.

In particular, three arrangements are used for transferring energy into or out of the confined oscillating field. These are the inductive coupling loop 37, and the capacitive coupling plate 6 shown in Fig. 1, and the beam of electrons projected through the field shown in Fig. 10. The inductive coupling loop 37 is placed in the field so as to interlink a quantity of lines of magnetic flux. The capacitive coupling plate 6 is placed in the field where it will intercept the desired electric flux, and the beam of electrons of Fig. 10 is projected through the field in a direction and location such that the electric field will either accelerate or decelerate the electrons. Obviously, all of these three arrangements for energy coupling to the electromagnetic field may be used equally well for delivering energy to the field or for taking energy from the field inasmuch as the direction of energy flow relative to the circuit is dependent merely upon the phase relationship of the several voltages, currents, and fields concerned in the energy transfer.

The inductive loop is effective only to the extent to which it interlinks magnetic flux of the resonant field. In this connection it will be noted that conductors are not ordinarily carried entirely through the resonant field for coupling. The reason for this is evident from Figs. 6 and 7 for example. In Fig. 6 a conductor carried through the center of the resonant circular cylinder from top to bottom would, in principle, with its external connections interlink all the magnetic flux of the enclosed field and the coupling would apparently be a maximum. If the conductor carried through did not lie on the center line, but were formed into a loop reaching into the magnetic flux toward either edge of the container the result would be a decrease in the coupling because some of the magnetic flux would not be interlinked with the coupling circuit with the consequent cancellation of an amount of flux equivalent to the flux which is included twice. Thus, for small coefficients of coupling with a conductor carried through the center structure, the conductor must be formed into a large loop with consequent disadvantages of distributed capacitance and high resistance. Accordingly inductive coupling is made as shown by loop 37 in Fig. 1. In this arrangement the smaller the loop in general the lesser the coupling.

Further, regarding the conductor carried through the center of an enclosed field of the form shown in Fig. 7, it will be seen that such an arrangement will have zero coupling inasmuch as the magnetic flux is confined to regions which are not magnetically interlinked with the conductor. Coupling in a field of this form is, however, made conveniently by means of a coupling loop as indicated by 37 in Fig. 1, but rotated 90 degrees from the position shown in Fig. 1. In general, for any mode of oscillation of the confined field a coupling loop 37 inserted through the wall of the enclosing surface 1 as shown in Fig. 1 either in the orientation shown or in quadrature therewith will accomplish effective coupling.

Similarly in the use of capacitive coupling elements, such elements for maximum effect are comparatively thin plates placed so their flat surfaces are perpendicular to the electric field lines. In Fig. 6 the proper location for a capacitive coupling element is parallel to the flat surfaces of the enclosing member 1. Such a capacitive element may have an area approximating that of the top or bottom of member 1. In Fig. 7 a large capacitive element might be inoperative because it would short circuit the electric flux in certain regions. A proper capacitive element would be one comparatively small in comparison with the structure as a whole placed in a region in which the electric flux is in one direction only. Proper locations would be anywhere perpendicular to the circular solid lines representing electric flux in Fig. 7.

In coupling an electron beam into the enclosed electromagnetic field as shown in Fig. 10, a condition that should be fulfilled for best results is that the electrons should pass through the field in one-half period of oscillation or less. Effective results are obtained with a time of transit of the order of a tenth of a period or less. Obviously, the transfer of energy between the electrons and the field will take place in any geometrical form of field although for some arrangements it is desirable to have the field comparatively intense and uniform in the region through which the electrons are projected. These conditions are easily attained using the geometrical delineations of electromagnetic field described above in reference to the Stäckel systems of surfaces. Other desirable forms, however, are obviously derivable from the form shown in Fig. 10.

Having described my invention, what I claim and desire to secure by Letters Patent is:

1. Means for producing high electron velocities, comprising a substantially closed conducting member providing a chamber therein, means for setting up a confined high-frequency standing electromagnetic field within said chamber resonant at the natural frequency of said member, means for introducing electrons into said chamber in such position that said field will accelerate said electrons during their passage through said member, and means for reversing the direction of travel of said electrons for passage in the reverse direction through said chamber while retaining said electrons in proper phasal relation with said standing field such that the electrons will continue to absorb energy therefrom, said electrons leaving said chamber when a desired high velocity has been attained.

2. Means for altering the velocity of electrons while in flight comprising, a hollow internally resonant conducting cavity member, means for producing standing electromagnetic waves therein resonant at the natural frequency of said member, and means for projecting electrons therethrough to be acted upon by the standing waves within said cavity member.

3. The method of producing electrons of uniform high velocity which comprises, producing a confined and sharply bounded system of standing electromagnetic waves, producing a beam of electrons, passing said beam of electrons repeatedly through said system of standing electromagnetic waves, and excluding said beam of electrons from said system of standing electromagnetic waves except when the phase of said system of electromagnetic waves is correct for giving the electrons the desired acceleration.

4. In a device of the character described, a hollow substantially closed conducting member arranged to contain a standing electromagnetic field, means for setting up a standing electromagnetic field therein resonant at the natural frequency of said member, means for projecting a stream of electrons through the field for altering the velocity of the electrons composing the stream, and means for reversing the electrons after their passage through the field for effecting another passage of the electrons therethrough to further alter the velocity of the electrons composing the stream, the field being of such dimension and said reversing means so located with respect thereto, that the electrons reenter the field in the proper phase to effect continued change in their velocity in the same sense as that obtaining during their first transit through the field.

5. Means for producing electrons of uniformly high velocity comprising, an electrical converter, a hollow resonator, means for coupling said converter to said resonator for setting up confined standing electromagnetic waves therein, and means for passing a stream of electrons through said resonator in the general direction of the electric component of said waves for effecting changes in the velocity of the electrons of said stream.

6. Means for producing electrons of uniformly high velocity comprising, an electrical converter, a hollow resonator containing said converter, means for coupling said converter to said resonator for establishing standing electromagnetic waves resonant therein, and means for repeatedly passing a stream of electrons through said resonator in the general direction of the electric component of said waves for effecting changes in the velocity of the electrons of said stream.

WILLIAM W. HANSEN.